United States Patent
Khalil et al.

(10) Patent No.: US 9,530,116 B2
(45) Date of Patent: Dec. 27, 2016

(54) FINITE STATE MACHINE-BASED CALL MANAGER FOR WEB-BASED CALL INTERACTION

(71) Applicant: Verizon Patent and Licensing Inc., Basking Ridge, NJ (US)

(72) Inventors: Manah M. Khalil, Irving, TX (US); Mohammad Y. Salman, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 809 days.

(21) Appl. No.: 13/903,498

(22) Filed: May 28, 2013

(65) Prior Publication Data

US 2014/0359462 A1 Dec. 4, 2014

(51) Int. Cl.
| | |
|---|---|
| H04L 12/66 | (2006.01) |
| G06Q 10/10 | (2012.01) |
| G06Q 30/00 | (2012.01) |
| H04M 3/51 | (2006.01) |
| H04M 7/00 | (2006.01) |
| H04L 29/06 | (2006.01) |

(52) U.S. Cl.
CPC .............. *G06Q 10/10* (2013.01); *G06Q 30/01* (2013.01); *G06Q 30/016* (2013.01); *H04L 65/1053* (2013.01); *H04L 65/1069* (2013.01); *H04L 65/1096* (2013.01); *H04M 3/5183* (2013.01); *H04M 7/0024* (2013.01); *H04M 2201/42* (2013.01)

(58) Field of Classification Search
CPC .................................................. G06F 17/2247
USPC ................................. 715/234, 738; 370/352
See application file for complete search history.

(56) References Cited

U.S. PATENT DOCUMENTS

| | | | | |
|---|---|---|---|---|
| 2005/0228668 A1* | 10/2005 | Wilson | ................... | G10L 15/22 704/256 |
| 2007/0274300 A1* | 11/2007 | Chu | .................... | H04M 1/2535 370/356 |
| 2008/0320155 A1* | 12/2008 | Ganapathy | ........ | G06F 17/30203 709/230 |
| 2011/0302316 A1* | 12/2011 | Chou | ...................... | H04L 67/02 709/228 |
| 2014/0075287 A1* | 3/2014 | Scoda | ............... | G06F 17/30038 715/234 |

* cited by examiner

*Primary Examiner* — Wei Zhao
*Assistant Examiner* — Abdeltif Ajid

(57) ABSTRACT

Systems, methods, devices, and non-transitory storage media provide a web-based graphical user interface to allow a user to control a softphone of a user device. A context handler operates on the user device and manages a page context of the web-based graphical user interface. A call manager operates as a RESTful web service on the user device. The context handler and the call manager communicate using JavaScript Object Notation with Padding (JSONP) messages. The call manager includes a finite state machine that indicates a current state of the softphone. The call manager generates application programming interface calls to the softphone in response to receiving JSONP messages. The user interface is updated to reflect the current state of the softphone based on execution of user selections by the softphone. The context handler chunks data into multiple JSONP messages if data exceeds a data size limitation of the JSONP.

20 Claims, 15 Drawing Sheets

FINITE STATE MACHINE-BASED CALL MANAGER FOR WEB-BASED CALL INTERACTION

BACKGROUND

Call centers provide various services to customers, such as technical support, change of service, sign on new customers, terminate service, etc. The network allows call center representatives (call center agents) to interact with customers or potential customers through various forms of communication, such as telephone, e-mail, etc. With the migration toward IP-based communication, however, legacy tools and stand-alone tools may present network administrators with issues that inhibit collaboration between these tools and prevent seamless interaction between these tools from the perspective of the representatives.

DETAILED DESCRIPTION OF PREFERRED EMBODIMENTS

Figure 1:
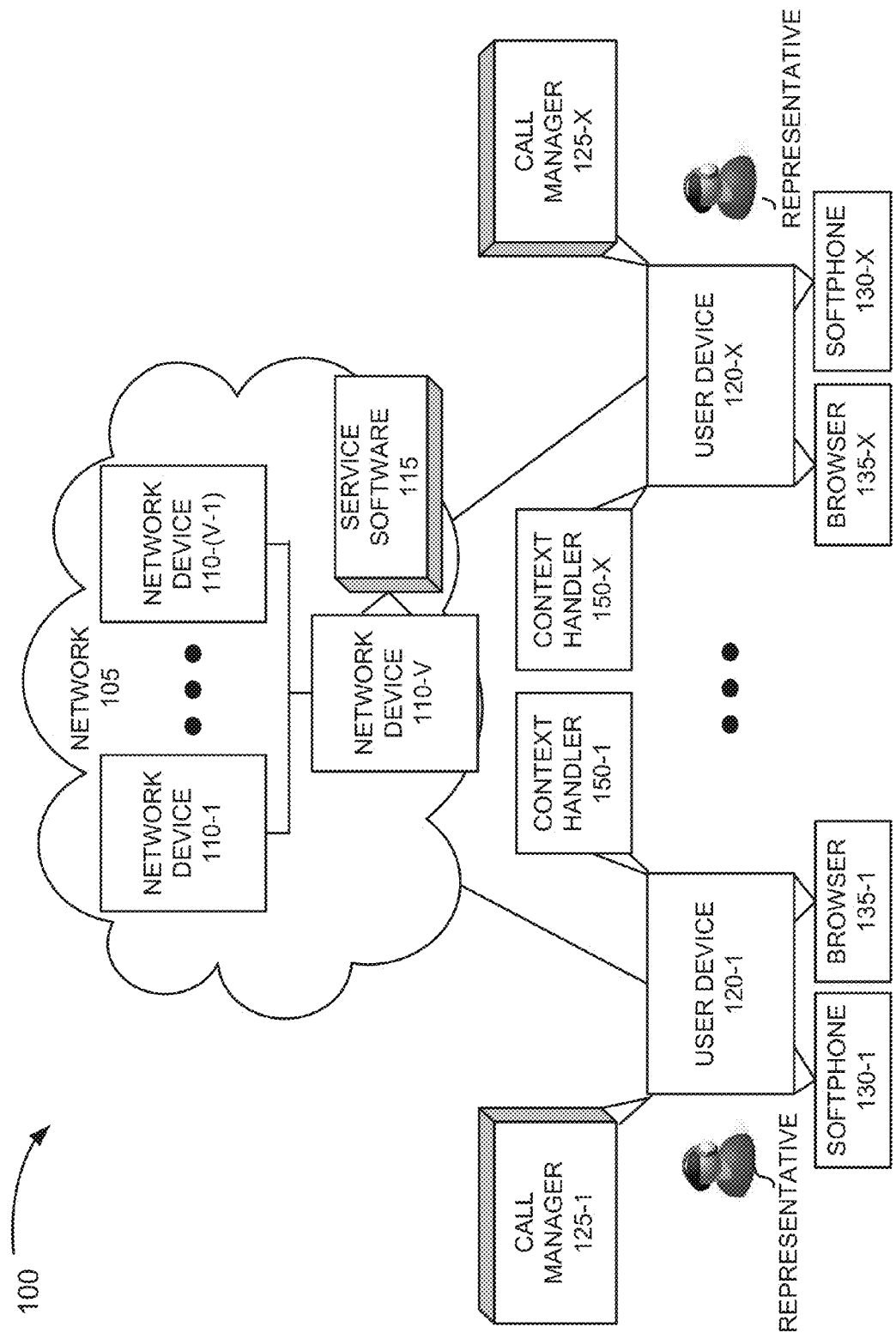
FIG. 1 is a diagram illustrating an exemplary environment in which a finite state machine-based call manager providing web-based call interaction may be implemented.

The following detailed description refers to the accompanying drawings. The same reference numbers in different drawings may identify the same or similar elements. Also, the following description does not limit the invention.

Representatives of a call center may use various tools to provide customer service support. For example, a representative may use a computer, a telephone (e.g., soft or hard), and various software for call handling, account management, etc. With current trends in call center technology migrating toward IP or Internet/Web-based tools, representatives may be relegated to the task of performing "swivel chair" interfacing, in which the representatives manage multiple tools. By way of example, a representative may use a softphone on a computer to speak with a customer and concurrently have a browser open to use a web application that affords account management features. The representative needs to operate the softphone and the web application to serve the customer. This framework presents network administrators with various challenges relating to network management (e.g., data integration, user interface integration, user friendliness, etc.).

The term "call," as used herein, is intended to include a telephone call. For example, the call may be a Voice-over-Internet Protocol (VoIP) call, a plain old telephone call, or a combination thereof.

According to an exemplary embodiment, a call manager acts as an intermediary component (e.g., a proxy) between a telephone (e.g., a softphone) and a context handler. According to an exemplary embodiment, the call manager and the context handler are implemented on a computational device (e.g., a computer). The context handler manages the content displayed on the computational device. For example, the computational device includes a web browser to provide a softphone user interface and other user interfaces pertaining to customer service (e.g., service account management). The context handler manages the user interfaces displayed via the web browser. According to an exemplary implementation, the context handler may be implemented as a hook (e.g., a Java Script hook, a .com hook). As described further below, user interactions via the user interfaces, which are displayed by the web browser, are communicated through the context handler to the call manager. Additionally, other types of events may be communicated from the call manager to the context handler.

The computational device may include the softphone. According to other implementations, the computational device may not include a softphone. Rather, a representative may use a hardphone.

According to an exemplary embodiment, the call manager includes a finite state machine (FSM) to identify a current state of a call and communicates that state to either the softphone or the context handler. For example, a user's interaction with the softphone user interface (e.g., a selection of a call button) is communicated to the softphone via the context handler and the call manager. Additionally, an event from the softphone (e.g., ringing) is communicated to the context handler via the call manager. In response, the context handler may modify the user interface context or page context displayed via the web browser. For example, a browser instance (e.g., an object of a web page displayed by the web browser) may be updated based on the event (e.g., ringing).

According to an exemplary embodiment, communications between the call manager and the context handler use JavaScript Object Notation with Padding (JSONP). According to an exemplary embodiment, the call manager establishes a RESTful web service endpoint that processes the JSONP requests and responses. According to an exemplary embodiment, the context manager is configured to chunk messages that have a size greater (e.g., greater than 200 characters) than a message size afforded by JSONP.

FIG. 1 is a diagram illustrating an exemplary environment 100 in which a finite state machine-based call manager providing web-based call interaction may be implemented. As illustrated, environment 100 includes a network 105 that includes network devices 110-1 through 110-V, in which V>1 (also referred to collectively as network devices 110 or generally as network device 110). Environment 100 also includes user devices 120-1 through 120-X, in which X>1 (also referred to collectively as user devices 120 or generically as user device 120). User devices 120 include call managers 125-1 through 125-X (also referred to collectively as call managers 125 or generally as call manager 125), softphones 130-1 through 130-X (also referred to collectively as softphones 130 or generally as softphone 130), browsers 135-1 through 135-X (also referred to collectively as browsers 135 or generally as browser 135), and context handlers 150-1 through 150-X (also referred to collectively as context handlers 150 or generally as context handler 150).

Environment 100 may be implemented to include wired, optical, and/or wireless connections among the devices and network illustrated. A connection may be direct or indirect and may involve intermediary device(s) and/or network(s) not illustrated in FIG. 1. Additionally, the number and the arrangement of connections between the devices and the network are exemplary.

The number of devices and networks, and the configuration in environment 100 are exemplary. According to other embodiments, environment 100 may include additional devices, fewer devices, different devices, and/or differently arranged devices, than those illustrated in FIG. 1. Additionally, or alternatively, environment 100 may include an additional network and/or a differently arranged network, than that illustrated in FIG. 1.

A device may be implemented according to a centralized computing architecture, a distributed computing architecture, or a cloud computing architecture. Additionally, a device may be implemented according to one or multiple network architectures (e.g., a client device, a server device, a peer device, a proxy device, or a combination thereof).

Network 105 includes one or multiple networks of one or multiple types. For example, network 105 may include a public network, a private network, a wide area network, the Internet, a metropolitan area network, a data network, a packet-based network, a circuit-based network, a telephone network (e.g., Voice-over Internet Protocol (VoIP), a public switched telephone network (PSTN)), or some combination thereof.

Network devices 110 include network devices that provide call center services. For example, a portion of network devices 110 may include an automatic call distribution (ACD) device, an interactive voice response (IVR) device, a computer telephony integration (CTI) device, a customer relationship management (CRM) device, a call data device, a storage device that stores a customer database, or some combination of these devices. Network device 110-V includes a web-based customer service device. For example, network device 110-V includes service software 115 that allows representatives to sign-up new customers, pull account information pertaining to existing customers, order new services, order equipment, disconnect service, cancel a service, etc., regarding a service offered by a service provider. By way of example, the service may include a telephone service, Internet service, mobile service, television service, or some combination thereof. According to an exemplary embodiment, service software 115 provides a web user interface to allow a representative to control and operate the representatives' telephones (e.g., softphones 130). For example, the web user interface allows the representative to make calls, receive calls, transfer calls to another representative, etc. According to an exemplary embodiment, the web user interface indicates the current state of the representatives' telephones via user interface elements (e.g., buttons, menus, etc.). As described further below, the web user interface is displayed on user device 120 via web browser 135.

User device 120 includes a device having communicative and display capabilities. For example, user device 120 may include a computer (e.g., a desktop computer, a laptop computer) or other form of a computational terminal that includes peripheral devices (e.g., a display, keyboard, mouse, etc.).

User device 120 includes a call manager 125. Call manager 125 may be implemented as a Microsoft® .NET desktop application. According to other implementations, call manager 125 may be implemented according to other platforms (e.g., Java, etc.). According to an exemplary embodiment, call manager 125 acts as an intermediary communicative entity between softphone 130 and context handler 150. For example, call manager 125 may communicate an event pertaining to a call (e.g., termination of a call, etc.) to context handler 150. In turn, context handler 150 may update a user interface (e.g., pertaining to softphone 130 and displayed via web browser 135) to reflect the occurrence of the event. Call manager 125 is described further below.

User device 120 includes softphone 130. Softphone 130 may be implemented as a desktop application. Softphone 130 may be implemented by softphones of various vendors (e.g., Avaya, Cisco, Genesys Toolkit, etc.). According to other implementations, the representative may use a hardphone. Although not illustrated, softphone 130 may communicate with an ACD device, a CTI device, a voice switch device, and/or other types of backend network devices of a call center. User device 120 also includes a web browser 135 to communicate with network device 110-V and service software 115. For example, web browser 135 may be implemented by web browsers of various vendors (e.g., Internet Explorer, Firefox, Google Chrome, etc.). Web browser 135 displays user interfaces to a representative. As described further below, a user interface may be updated to reflect an event based on communication between call manager 125 and context handler 150.

User device 120 also includes context handler 150. According to an exemplary implementation, context handler 150 may be implemented as a hook (e.g., a Java Script hook, a .com hook, etc.). Context handler 150 manages page context. For example, web browser 135 may display, on user device 120, customer service user interfaces stemming from communication with service software 115 of network device 110-V. Context handler 150 manages a browser instance of a customer service user interface that is rendered by user device 120. For example, the customer service user interface includes a user interface pertaining to softphone 130. The representative interacts with the softphone user interface when handling a call from a customer. Context handler 150 communicates the representative's interaction with the softphone user interface to call manager 125. Call manager 125 communicates with softphone 130 and/or other back end devices (e.g., a T-server, etc.). Upon completion of the representative's request/input, call manager 125 communicates to context handler 150, which in turn, updates/refreshes the softphone user interface. Context handler 150 is described further below.

Figure 2A:
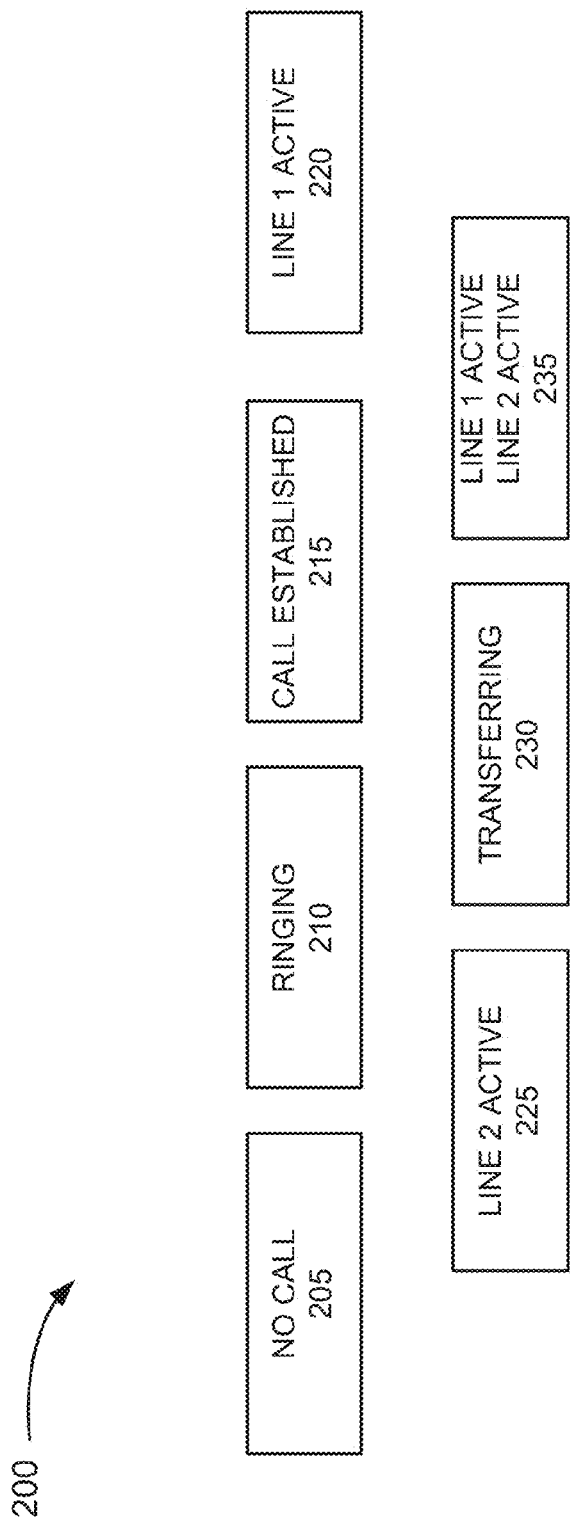
FIG. 2A is a diagram illustrating an exemplary states of a finite state machine of the call manager.

FIG. 2A is a diagram illustrating exemplary states of a finite state machine 200 used by call manager 125. For example, a state of finite state machine 200 represents an event associated with softphone 130 stemming from communication between a representative and a customer or lack thereof. By way of further example, a no call state 205 indicates that line 1 or line 2 is not active. A ringing state 210 indicates that line 1 or line 2 is ringing. A call established state 215 indicates that a call is established. A line 1 active state 220 indicates that line 1 is an active line (e.g., a call session is ongoing over line 1). A line 2 active state 225 indicates that line 2 is an active line (e.g., a call session is ongoing over line 2). A transferring state 230 indicates that an active line (e.g., a call session) is transferring to another device. A line 1 active and a line 2 active state 235 indicate that both line 1 and line 2 are active lines. According to other exemplary embodiments, finite state machine 200 may include fewer states, additional states, and/or different states that represent a communication state, softphone 130 state, etc. For example, FSM 200 may include a hold state, a mute state, etc.

Figure 2B:
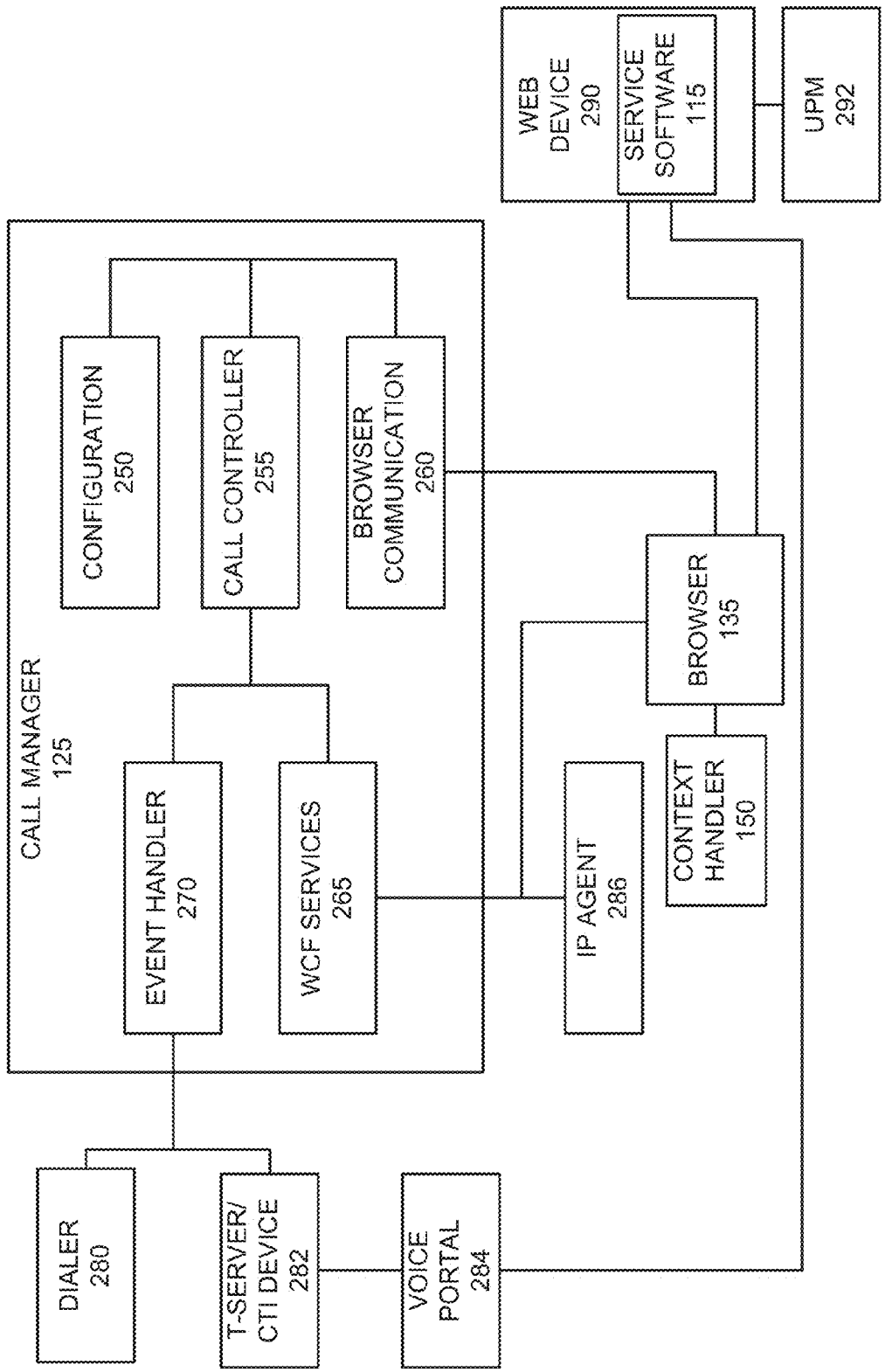
FIG. 2B is a diagram illustrating exemplary components of a call manager.

FIG. 2B is a diagram illustrating exemplary components of call manager 125. According to an exemplary embodiment, call manager 125 is a desktop application. As illustrated, call manager 125 includes a configuration module 250, a call controller module 255, a browser communication module 260, a Windows Communication Foundation (WCF) services module 265, and an event handler module 270. FIG. 2B also illustrates network elements that may be implemented in network devices 110, such as a dialer 280, a T-server/CTI device 282, a voice portal 284, a web device 290, and a User Profile Management repository (UPM) device 292.

Configuration module 250 loads a configuration file to initialize call manager 125. As described below, the configuration file may be obtained from service software 115 or from a cache resident on user device 120.

Call controller module 255 manages a call based on FSM 200. Browser communication module 260 transmits messages to context handler 150. WCF services module 265 provides a RESTful web service. WCF services module 265 also provides an assemble function and generates API calls to softphone 130, as described herein.

Event handler module 270 listens to events (e.g., call ringing, call established, call transfer, etc.,) associated with a call. For example, the events may pertain to a dialer 280 (e.g., Avaya Dialer) or T-server/CTI device 282.

According to an exemplary scenario, when call manager 125 is launched during a system start-up process of user device 120, call manager 125 will enter an idle state in the system tray. A call manager log is created and stored. According an exemplary implementation, a representative launches web browser 135 to communicate with network device 110 (e.g., web device 290) hosting service software 115. The representative enters login information via web browser 135. Web device 290 obtains user profile information from a UPM device 292. Web device 290 performs authentication and authorization. Upon a successful log in, web device 290 (service software 115) selects and transmits a configuration file to user device 120, which is received by call manager 125 via WCF services module 265 using the custom protocol over JSONP. The configuration file may include switch type data, company identifier, station identifier (e.g., user device identifier), call manager group level flags, and T-server identifier associated with a CTI device. According to another implementation, call manager 125 obtains the configuration file from cache. Call manager 125 initializes data objects and services set forth in the configuration file.

Call manager 125 registers with T-server/CTI device 282. T-server/CTI device 282 includes a device for handling the data part of the telephone call by interacting with a telephony switch to obtain call events and route calls (e.g., by an Inbound Call Management (ICM) system) to the appropriate call center. For example, call manager 125 sends a registration request. Upon successfully registration, call manager 125 receives a registration response. Voice portal 284 includes an automated system to interact with customers to obtain preliminary information and reason for telephone call. Voice portal 284 may then route the call to the appropriate call center.

A call manager user interface indicates (e.g., via a graphical element) successful registration. After successfully registration and login of the representative, calls may be received. For example, when a line is established (e.g., call ringing, call established), call manager 125 launches a URL of service software 115. The URL is included in the configuration file. Thus, call manager 125 provides an auto-pop up of a browser window pertaining to the incoming call. As described further below, the representative may operate softphone 130 via the browser window as well as provide other customer services.

According to an exemplary embodiment, call manager 125 monitors the number of service software 115 browser windows opened at any given time. Call manager 125 limits the number of browser windows. For example, during the loading/unloading of every page pertaining to service software 115, a message is sent to call manager 125 to allow call manager 125 to count each page. If a preset limit is reached, call manager 125 verifies the number by counting the number of web browser windows loading the specific URL. After verification is made, call manager 125 displays an alert to the representative.

Figure 3A:
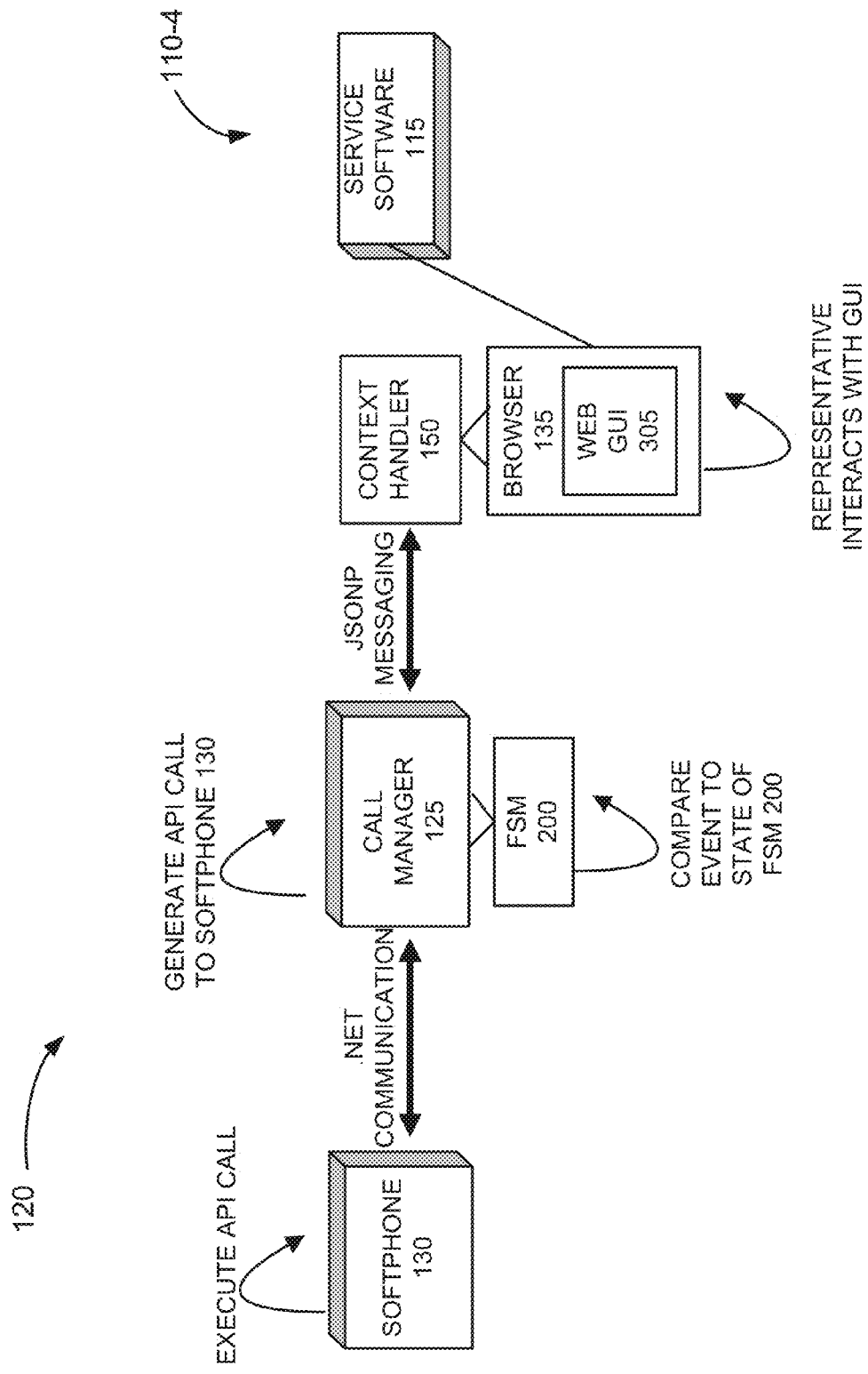
FIGS. 3A-3C are diagrams illustrating exemplary communication between a call manager, a softphone, and a web service software.
Figure 3B:
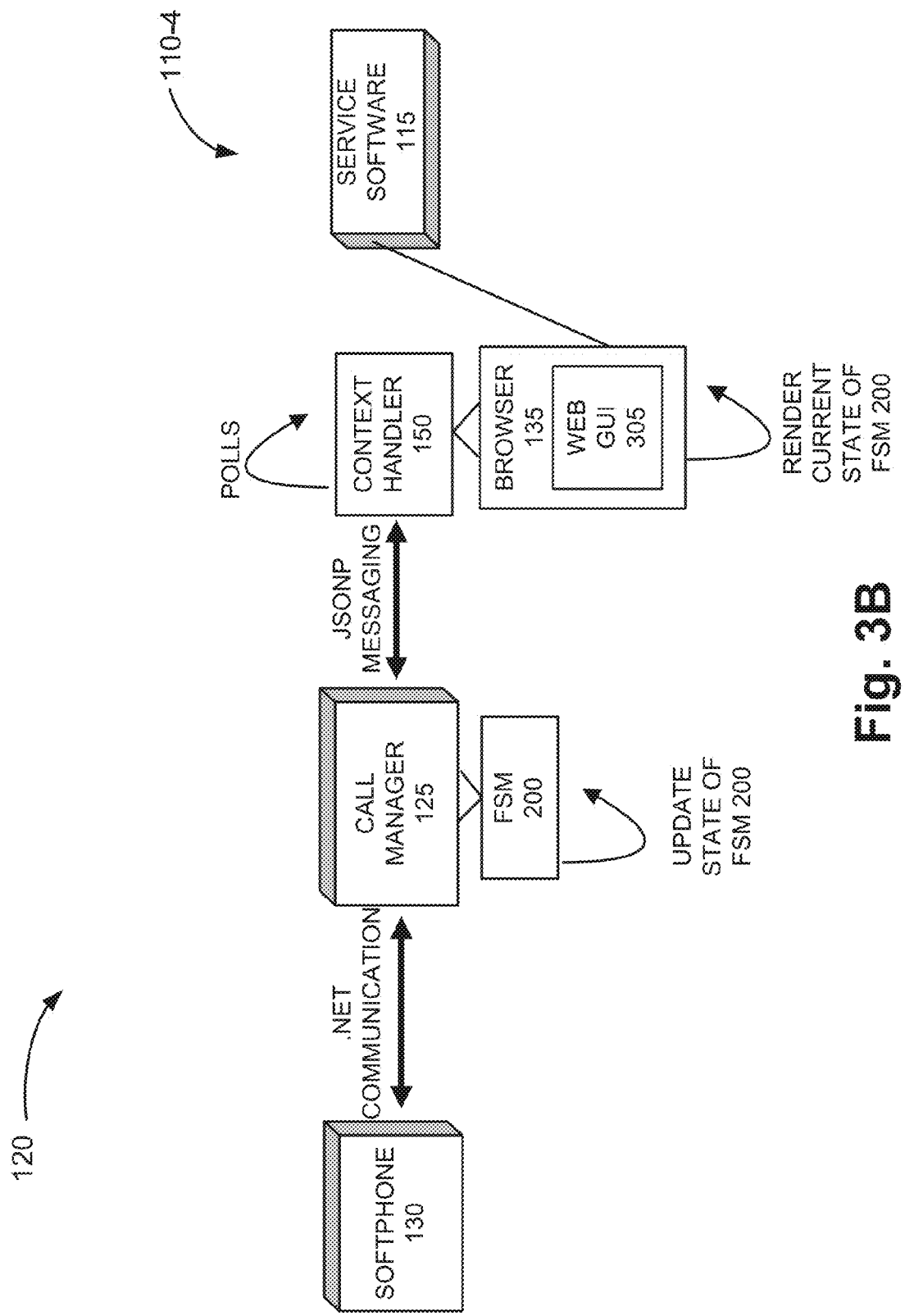
Figure 3C:
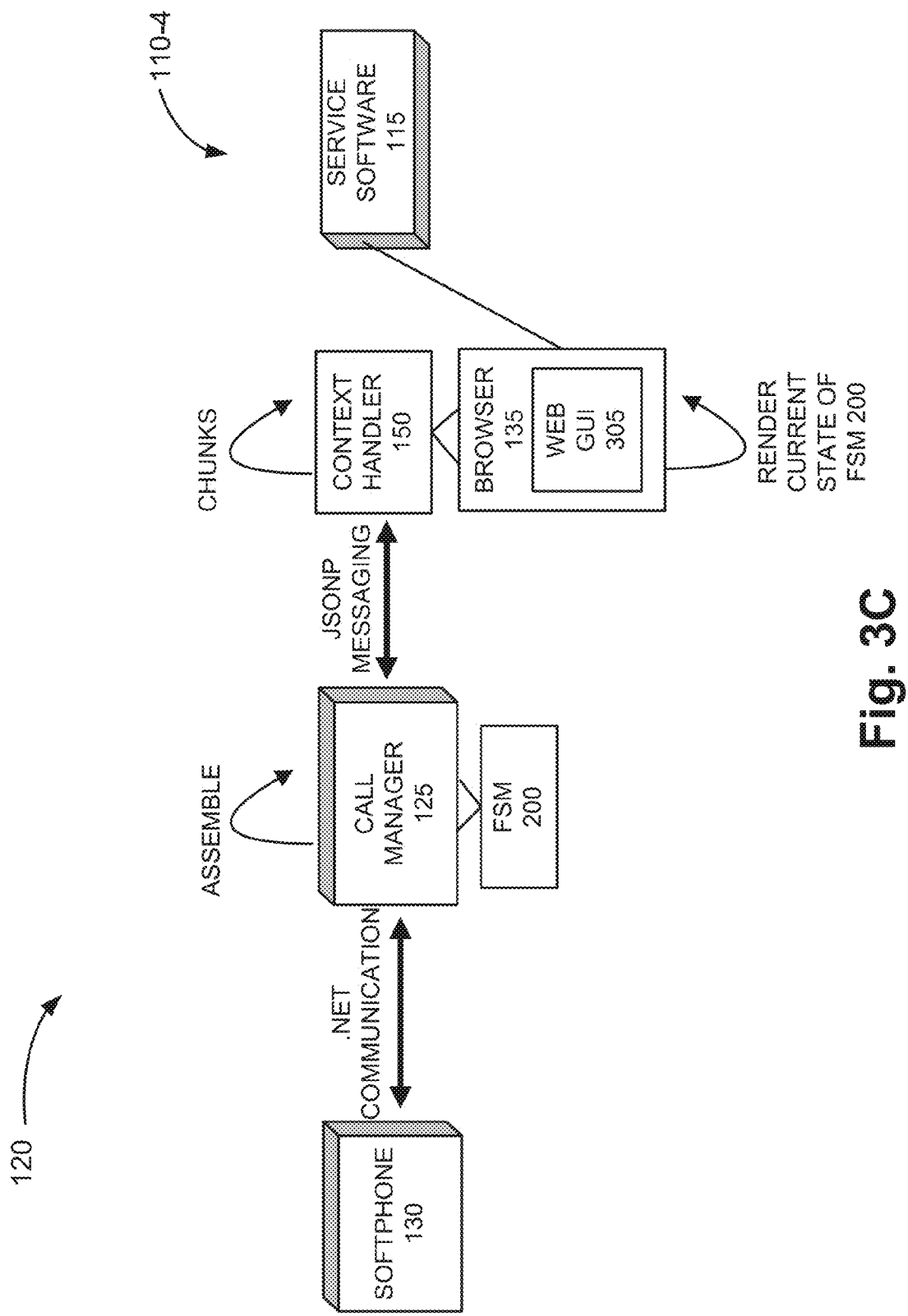
Figure 3D:
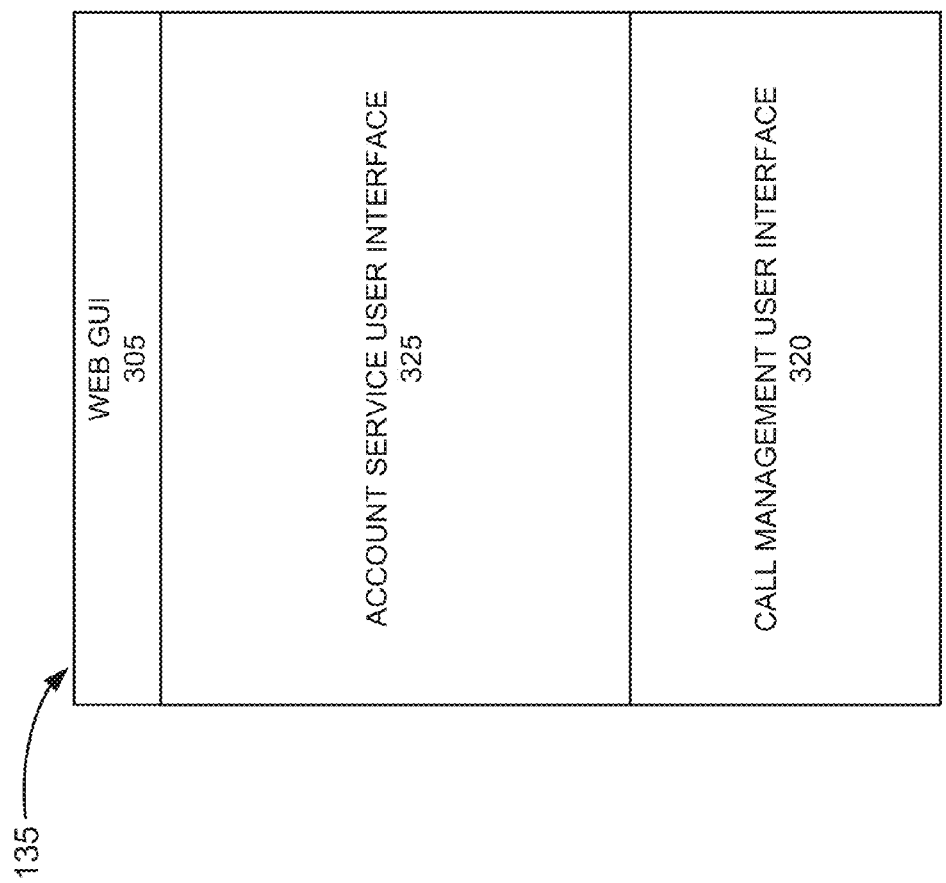
FIG. 3D is a diagram illustrating an exemplary web graphical user interface.

FIGS. 3A-3C are diagrams illustrating exemplary communication between call manager 125, softphone 130, and context handler 150. For purposes of description, assume user device 120 is connected to network device 110 that includes service software 115. Also assume that a representative (not illustrated) operating user device 120 is viewing a web graphical user interface (GUI) 305 of service software 115 via browser 135. For example, referring to FIG. 3D, web graphical user interface 305 includes a call management user interface 320 and an account service user interface 325. Call management user interface 320 includes graphical elements to operate softphone 130. For example, the graphical elements may include buttons (e.g., a call button, a transfer button, etc.), a menu, labels, other types of HTML elements, etc. Additionally, a graphical element may provide an indication of a state of softphone 130. For example, the state of softphone 130 may be represented by the graphical element (e.g., a button, etc.) using color, in view of the position of the graphical element in call management user interface 320, the representative's inability to select the graphical element (e.g., an inactive button), the representative's ability to select the graphical element, etc. By way of further example, if the representative is on a call, numerical buttons for dialing a call and a call button may be disabled or inactive. Account service user interface 325 includes graphical elements that allow the representative to sign-up new customers, pull account information pertaining to existing customers, order new services, order equipment, disconnect service, cancel service, etc.

According to other implementations, web graphical user interface 305 may include additional, different, or fewer user interfaces. For example, other departments associated with a service provider that interact with customers may have a user interface other than account service user interface 325. That is, account service user interface 325 may be replaced with a user interface relevant to the service provided by a department, call center representative, service provider personnel, etc. For example, a department (e.g., a Dispatch Resource Center) may be responsible for delivering installation, maintenance, and repair assignments to technicians. The call center representatives may interact with technicians. For example, when a technician support center representative receives a call, the technician's name, employee code, load information, as well as job details are automatically displayed. Online banners and alerts may be included in the user interface to provide instant notification of outages, metrics, training and workload requirements.

Referring to FIG. 3A, according to an exemplary embodiment, the connection between user device 120 and service software 115 is over a Secure Sockets Layer (SSL) communication. For purposes of description, assume that web graphical user interface 305 has a fully qualified domain name (FQDN). According to an embodiment, communication between call manager 125 and context handler 150 includes the use of the JSONP. The JSONP allows events to be communicated to and from call manager 125 without requiring call manager 125 to use the SSL. Additionally, the JSONP allows events to be communication to and from context handler 150. In this way, the data associated with web graphical user interface 305, which is resident on user device 120, may be updated/refreshed without communication to network device 110-V (e.g., service software 115). According to other implementations, however, communication (e.g., Ajax-based communication) may be conducted between user device 120 and network device 110-V to reflect events.

As illustrated in FIG. 3A, call manager 125 shuttles messages between softphone 130 and context handler 150. According to an exemplary scenario, assume the representative is viewing call management user interface 320 of web graphical user interface 305 via browser 135 based on a call received from a customer. Thereafter, the representative interacts (e.g., selects a button) with call management user interface 320 of web graphical user interface 305 and causes an event to occur (e.g., due to the selection of the button). For example, the representative may terminate the call, transfer the call, put the call on hold, etc. In turn, context manager 150 (e.g., Java Script running on the page) generates an event message in response to a detection of the event (e.g., the representative's input via call management user interface 320). For example, context handler 150 generates a JSONP request. According to an exemplary embodiment, the JSONP request includes a verb and parameter format, as described further below. Context handler 150 transmits the event message (e.g., the JSONP request) to call manager 125.

Call manager 125 receives the JSONP request. Upon receipt of the JSONP request, call manager 125 compares the event indicated in the JSONP request to FSM 200 to determine if the event is valid (e.g., a valid next state, etc.) based on the current state indicated by FSM 200. If the event is valid, call manager 125 translates the event into an application programming interface (API) call to softphone 130. If the event is not valid, call manager 125 transmits an error message back to context handler 150. For this example, assume that the event is valid. In response to determining that the event is valid, call manager 125 communicates with softphone 130 using a cross-process message (e.g., a .NET communication or other API call). Upon receipt of the API call, softphone 130 executes the API call and returns a confirmation code to call manager 125.

Referring to FIG. 3B, upon receipt of the confirmation code, call manager 125 updates the state indicated by FSM 200 to reflect the completion of the event. According to an exemplary embodiment, context handler 150 continuously polls FSM 200 of call manager 125 to obtain the current state of FSM 200. Based on a polling result, context handler 150 renders web graphical user interface 305 to reflect the current state of FSM 200. For example, according to the example described above, when a next poll is received by call manager 125, call manager 125 transmits a JSONP response, and in turn, call management user interface 320 of web graphical user interface 305 is rendered to reflect the changed state (e.g., the state associated with the selection of the button).

According to other exemplary embodiments, polling may not be used. For example, call manager 125 may automatically push a state of FSM 200 to context handler 150 so that call management user interface 320 of web graphical user interface 305 may be updated/refreshed when the state of FSM 200 changes.

Given this framework, there is a separation of web graphical user interface 305 from the business logic (e.g., use of softphone 130, etc.). For example, even if web browser 135 crashes, the state information of softphone 130 is not lost since web graphical user interface 305 obtains the current state from FSM 200 of call manager 125. That is, if the representative is on a call and during the call web browser 135 crashes, after the representative restarts web browser 135, call management user interface 320 of web graphical user interface 305 will reflect that the representative is still on the call.

Figure 3E:
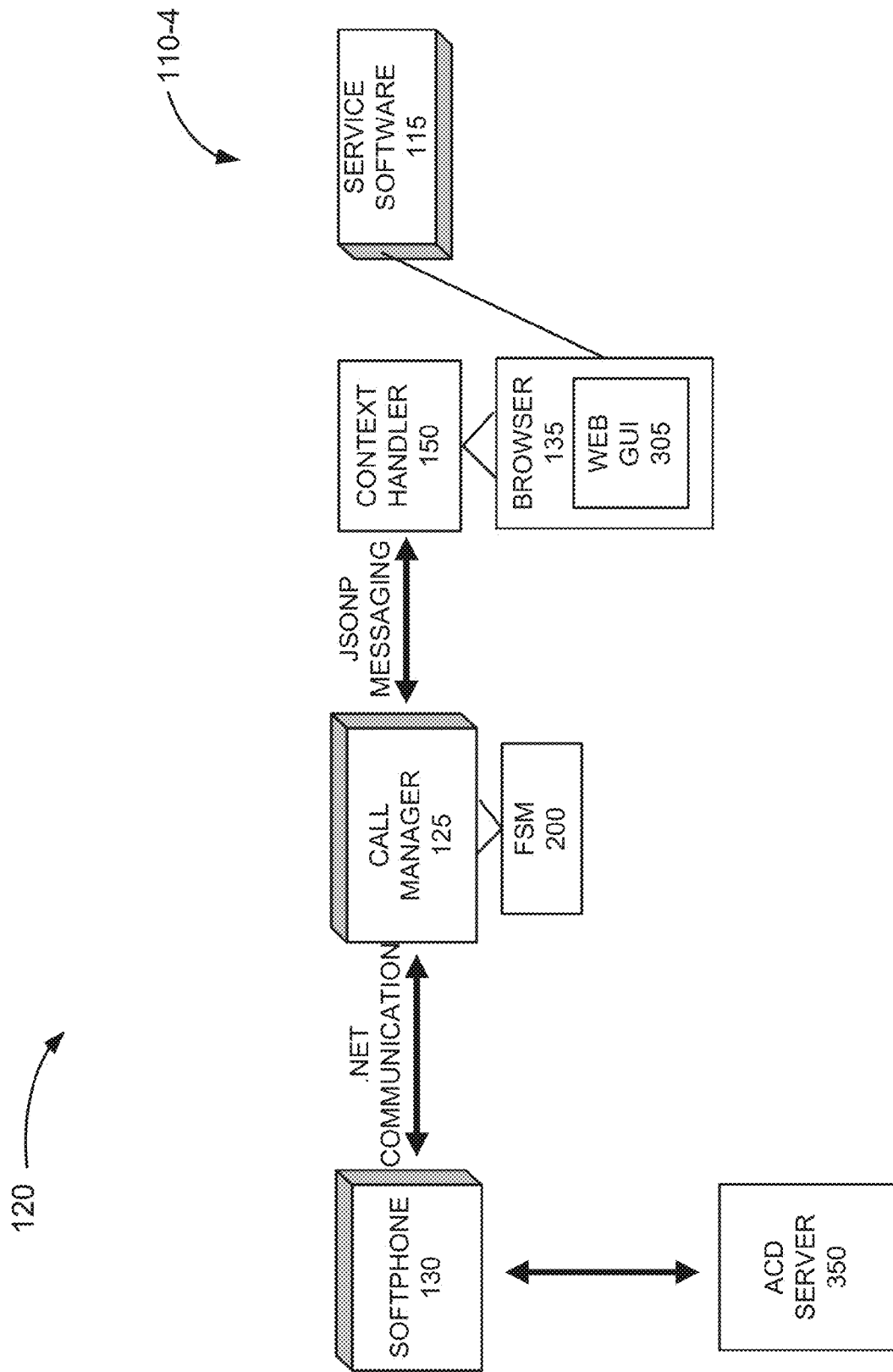
FIG. 3E is a diagram illustrating an exemplary communication between a call manager, a softphone, a context handler, and an automatic call distribution device.

According to other scenarios, an event associated with softphone 130 causes a message to be sent to call manager 125. By way of example, referring to FIG. 3E, softphone 130 may be communicatively coupled to an ACD device 350 or a voice switch device. When a call is terminated, softphone 130 receives an end-of-call message. Softphone 130 reports the event to call manager 125 in a cross process message. Call manager 125 communicates this event to context handler 150, and in turn, web graphical user interface 305 may be updated/refreshed so that the end-of-call message is reflected to the representative via web graphical user interface 305.

Figure 3F:
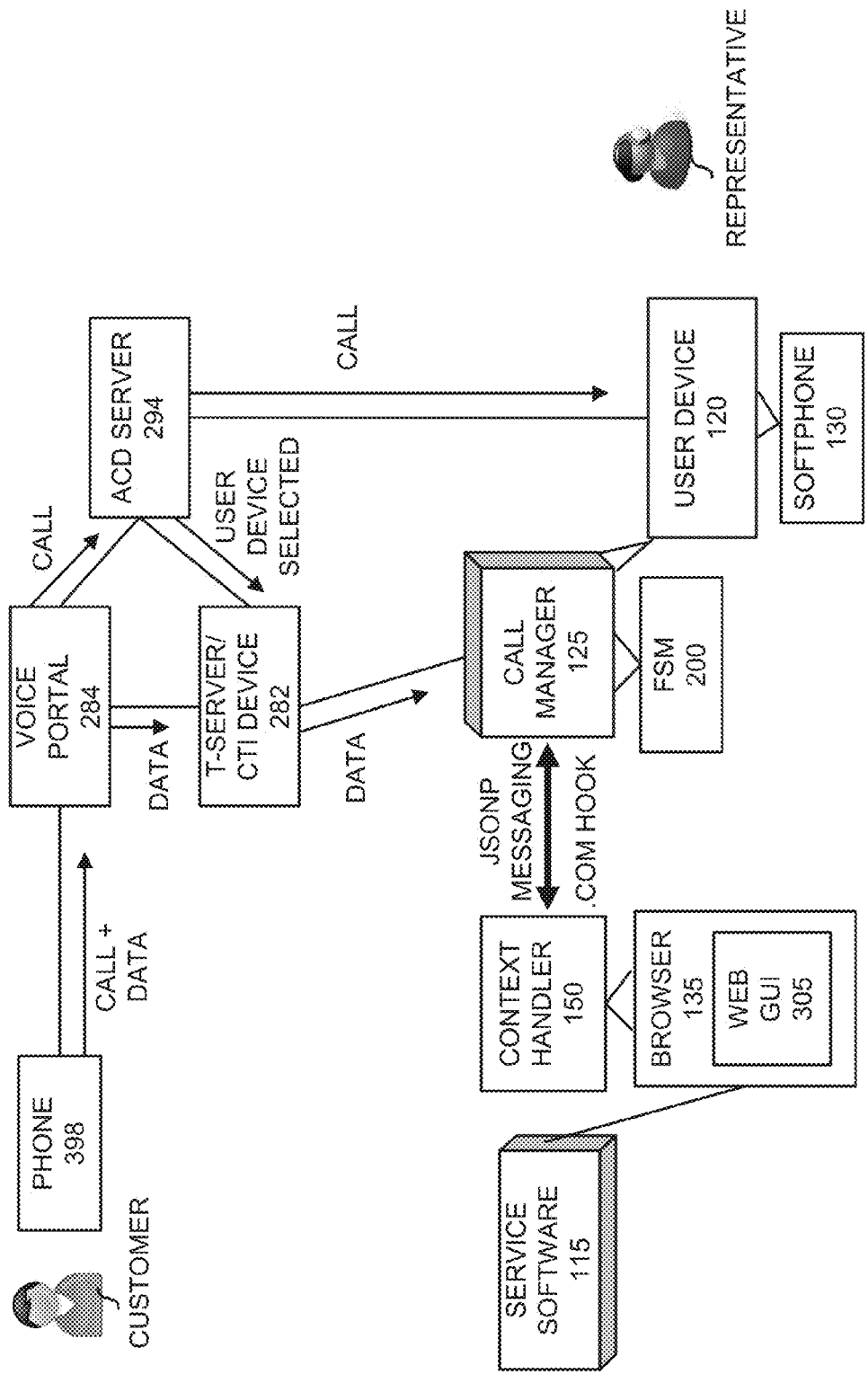
FIGS. 3F-3H are diagrams illustrating exemplary communication between a call manager, a context handler, and network devices.
Figure 3G:
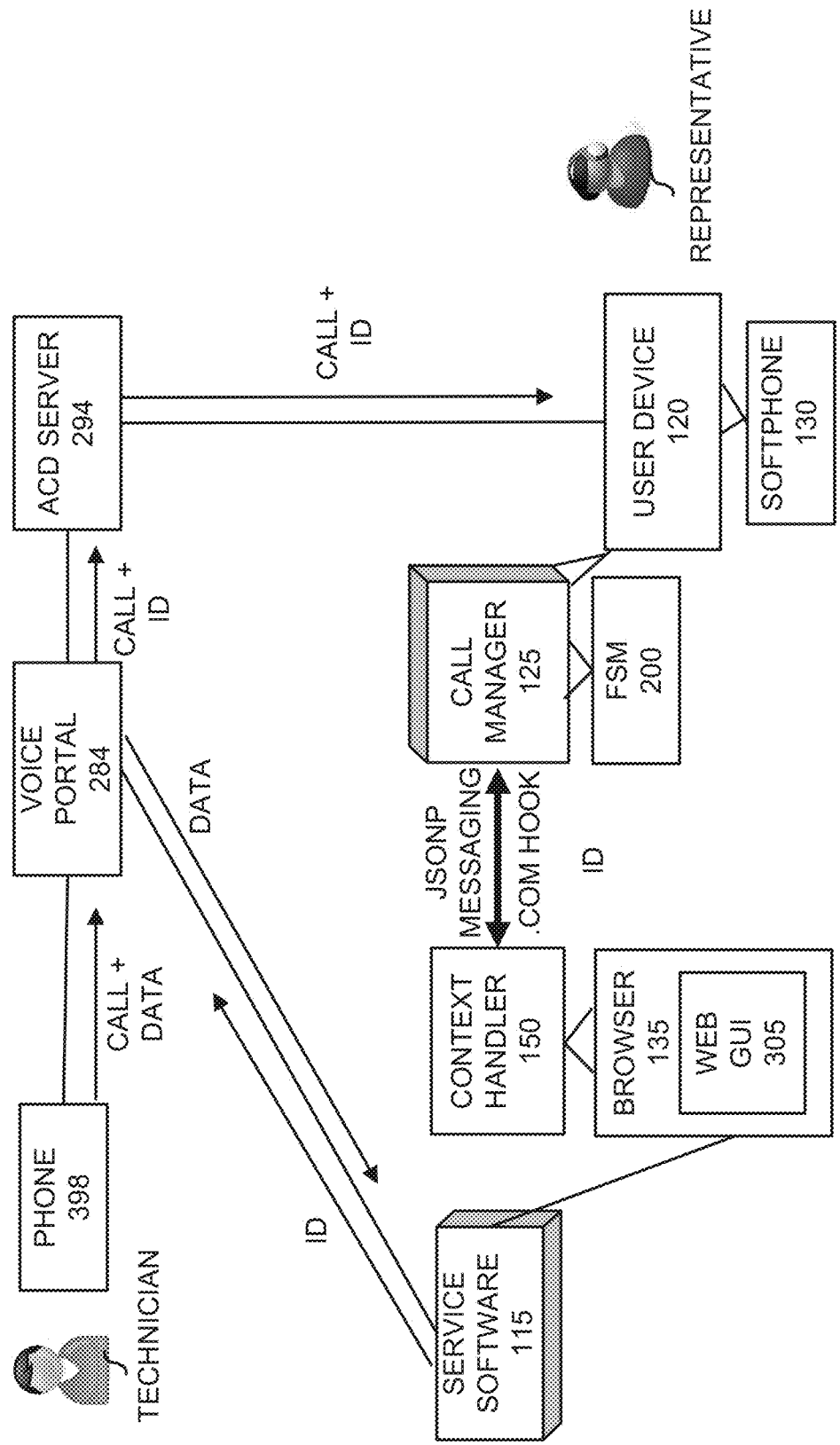
Figure 3H:
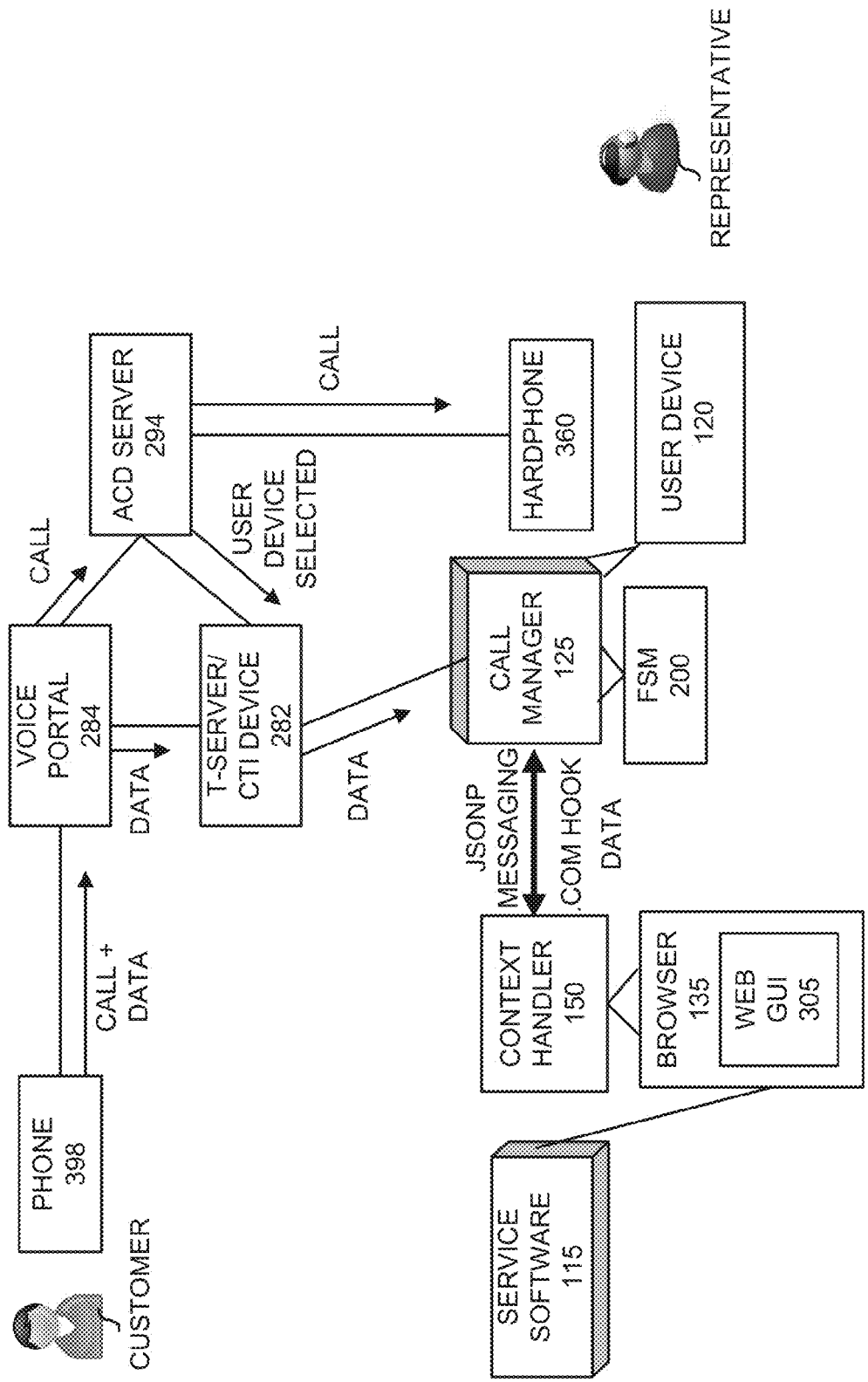

FIGS. 3F-3H are diagrams illustrating exemplary communication between call manager 125, context handler 150, and network devices 110. According to these call scenarios, a call is set up between the representative and another user (e.g., a customer, a technician, etc.). Additionally, data from voice portal 284 is used to populate web graphical user interface 305, as described herein.

Referring to FIG. 3F, assume a customer calls into voice portal 284 via phone 398. During the interaction with voice portal 284, the customer provides certain information. For example, the customer may identify/confirm the telephone number for which he or she is calling, a language that the customer wishes to use (e.g., English, Spanish, etc.), and other types of information. According to an exemplary implementation, the data may be stored as a key-value pair.

Subsequent to the interaction with voice portal 284, voice portal 284 transfers the call to ACD server 294. ACD server 294 selects, among other things, the appropriate representative to handle the incoming call and passes the call to the representative. Additionally, voice portal 284 passes the data to T-server/CTI device 282. ACD server 294 informs T-server/CTI device 282 of the selected representative to handle the call. In response, T-server/CTI device 282 passes the data to call manager 125 via user device 120. Call manager 125 and context handler 150 communicate to each other using JSONP messaging and a .com hook to pass the data, call event information, and user interaction input. In this way, web graphical user interface 305 will continue to be in sync with the customer call status.

Referring to FIG. 3G, assume a technician calls into voice portal 284 via phone 398. In this case, assume that the service provider does not use T-server/CTI device 282. According to this framework, when the data is obtained by voice portal 284, voice portal 284 passes at least some, if not all of the data to service software 115. In response to receiving the data, service software 115 generates an identifier and communicates the identifier back to voice portal 284. The identifier identifies the data and/or the call session associated with the incoming call from the technician. As illustrated, in response to receiving the identifier, voice portal 284 passes the call and the identifier to ACD server 294. ACD server 294, which may typically handle only the audio portion of a call, is capable of receiving the identifier due to its limited data size. Additionally, other devices (e.g., switches, routers, etc.) may be capable of receiving the identifier due to its limited data size. As illustrated, ACD server 294 passes the identifier and the call to user device 120. Call manager 125 obtains the identifier (e.g., from softphone 130). Call manager 125 passes the identifier to context handler 150 using JSONP messaging and a .com hook. In turn, web graphical user interface 305 will include call detail information relating to the technician. For example, the call detail information may include customer information pertaining to customers that the technician is servicing.

Referring to FIG. 3H, assume a customer calls into voice portal via phone 398. In this case, assume that the representative uses a hard phone 360 versus softphone 130. In a manner similar to that previously described, voice portal 284 passes the call to ACD server 294. ACD server 294 selects the representative and passes the call to hardphone 360. ACD server 294 provides T-server/CTI device 282 with information (e.g., an identifier of the representative, user device 120, etc.) pertaining to user device 120 associated with hardphone 360. In response, T-server/CTI device 282 passes the data to call manager 125. Call manager 125 passes the data to context handler 150 using JSONP messaging and a .com hook so that web graphical user interface 305 provides the appropriate information and is displayed to the representative via browser 135.

According to an exemplary embodiment, call manager 125 establishes a RESTful web service endpoint that can process JSONP requests over HTTP and respond with JSONP responses. However, there is a data size limitation relating to JSONP requests. The data size limitation may depend on the web browser (e.g., browser 135). In some instances, data to be communicated between context handler 150 and call manager 125 may have a size greater than the data size limitation of a JSONP request. According to an exemplary embodiment, context handler 150 includes a chunker to overcome this limitation. For example, referring to FIG. 3C, the chunker (not illustrated) divides data that is to be sent as a JSONP request into chunks in which each chunk has a size within the data size limit. The chunker may add padding and/or encoding to chunked data. The chunker may also add sequence numbers to facilitate reassembly at the destination (i.e., call manager 125). Call manager 125 includes an assembler (not illustrated) that assembles the chunked data. Additionally, the assembler may acknowledge receipt of each chunked data to network device 110. Since the payload data may also be base-64 encoded, the chunked data may include images (e.g., communication with an image scanner driver) or postscript (e.g., communication with a printer driver, etc.).

In addition since the user of the web graphical user interface may issue several commands simultaneously, the transmission of each request over JSONP will have a unique message ID where all the chunks of that same transmission will use this unique ID. Call manager 125, after assembling all the chunks and processing the entire message, will also send an acknowledgment (or response) for the entire message. This process will guarantee that lost or incomplete messages can be retried if the acknowledgment is not received within some timeout period.

Provided below is exemplary code, to be executed by the receiving side (e.g., call manager 125) of a JSONP communication, pertaining to the receipt of chunked data. The code includes processes to decode the chunked data and reassemble multiple chunked data based on sequence numbers. The code assumes the existence of a hash table object named "chunks" that stores the numbered chunks.

```
[AspNetCompatibilityRequirements(RequirementsMode =
AspNetCompatibilityRequirementsMode.Allowed)]
[ServiceBehavior(InstanceContextMode = InstanceContextMode.PerCall)]
public class CallManager : ICallManager
{
        public returnClass Get(string data)
        {
                returnClass returnClass = ProcessData(ref data);
                if (returnClass.AllChunksReceived == true)
                {
                //Process data
                        //if(function succcessfull)
                        //      returnClass.AppStatus = SuccessAppStatus;
                        //else
                        //      returnClass.AppStatus = FailedAppStatus;
                }
                return returnClass;
        }
        private static returnClass ProcessData(ref string data)
        {
                data = HttpUtility.UrlDecode(HttpUtility.UrlDecode(data)).Replace(char.ConvertFromUtf32(167), "/");
                data = data.Substring(1, data.Length - 2);
                string[ ] information = data.Split(char.ConvertFromUtf32(176).ToCharArray( ));
                if (!chunks.Contains(information[0].ToString( ))
                        chunks.Add(information[0].ToString( ), 1);
                else
                        chunks[information[0]] = int.Parse(chunks[information[0]].ToString( )) + 1;
                if (!chunks.Contains(information[1].ToString( ) + "-" + information[0].ToString( )))
                        chunks.Add(information[1].ToString( ) + "-" + information[0].ToString( ),
        information[4].ToString( ));
                //if all chunks are received, reconstruct
                if (int.Parse(chunks[information[0]].ToString( )) == int.Parse(information[2]))
```

```
        {
            data = string.Empty;
            //Reconstruct Data
            for (int i = 1; i <= int.Parse(information[2]); i++)
                data += chunks[i.ToString( ) + "–" + information[0].ToString( )].ToString( );
            string tempAppStatusMessage = string.Format("This chunk: {0}. Received {1} out of {2}.", information[1], chunks[information[0]], information[2]);
            returnClass result = new returnClass
            {
                CallbackFunction = information[3].ToString( ),
                AppStatusMessage = tempAppStatusMessage,
                //string.Format("This chunk: {0}. Received {1} out of {2}.", information[1], chunks[information[0]], information[2]),
                AllChunksReceived = true,
                RequestId = information[0].ToString( )
            };
            //Remove Data from Hashtable
            for (int i = 0; i < int.Parse(information[2]); i++)
                chunks.Remove(i.ToString( ) + "–" + information[0].ToString( ));
            chunks.Remove(information[0].ToString( ));
            return result;
        }
        else
        {
            string tempAppStatusMessage = string.Format("This chunk: {0}. Received {1} out of {2}.", information[1], chunks[information[0]], information[2]);
            return new returnClass
            {
                CallbackFunction = information[3].ToString( ),
                AppStatusMessage = tempAppStatusMessage,
                //string.Format("This chunk: {0}. Received {1} out of {2}.", information[1], chunks[information[0]], information[2]),
                AllChunksReceived = false,
                RequestId = information[0].ToString( )
            };
        }
    }
}
[DataContract]
    public class returnClass
    {
        private string appStatusMessage;
        private bool bAllChunksReceived = false;
        private string callbackFunction = string.Empty;
        private int appStatusCode = 0;
        private string requestId = string.Empty;
[DataMember]
        public string RequestId
        {
            get { return requestId; }
            set { requestId = value; }
        }
[DataMember]
        public int AppStatusCode
        {
            get { return appStatusCode; }
            set { appStatusCode = value; }
        }
[DataMember]
        public string CallbackFunction
        {
            get { return callbackFunction; }
            set { callbackFunction = value; }
        }
[DataMember]
        public bool AllChunksReceived
        {
            get { return bAllChunksReceived; }
            set { bAllChunksReceived = value; }
        }
[DataMember]
        public string AppStatusMessage
        {
            get { return appStatusMessage; }
            set { appStatusMessage = value; }
        }
    }
```

According to an exemplary embodiment, the JSONP messages use a verb and parameter(s) command format. For example, a JSONP message may include a verb (e.g., dial_out) and parameter(s) that instructs call manager 125 to interact with softphone 130 to tell softphone 130 to dial out a telephone number. Provided below are exemplary verbs that may be implemented in the call manager system. According to an exemplary implementation, there are two types of verbs: configuration verbs and runtime verbs including:

| Configuration verbs: | |
| --- | --- |
| /configure/<config> | //config: xml configuration |
| /configure/apply | //used to force configuration changes |
| Runtime verbs: | |
| /ready | //resume after break |
| /pause | // break time |
| /logout | |
| /login | |
| /answer | |
| /hangup | |
| /transfer/warm/<xxx-xxx-xxxx> | |
| /transfer/switch/party/<x> | // x: 1 ... n |
| /transfer/drop/party/<x> | // x: 2 ... n |
| /transfer/join | |
| /transfer/cold/<xxx-xxx-xxxx> | |
| /dial/<xxx-xxx-xxxx> | |
| /status/getvrudictionary | |
| /status/getANI | |
| /status/getCallid | |
| /status/getcalltime | |

According to an exemplary embodiment, when the representative interacts with call management interface 320 of web graphical user interface 305, context handler 150 selects one of the runtime verbs and parameter(s) and transmits one or multiple JSONP messages to call manager 125. Call manager 125 has or is designated by a URL (e.g., http://local host).

According to an exemplary embodiment, service software 115 uses the configuration verbs to configure call manager 125. For example, when a representative logs on to service software 115, service software 115 obtains representative profile information (e.g., name, what type of calls the representative will be receiving, transfer destinations, etc.). Service software 115 generates multiple JSONP requests to include portions of the configuration file and transmits the configuration file (e.g., an XML file) to call manager 125. Call manager 125 executes a configuration process based on the configuration file. During the configuration process, call manager 125 may communicate with other devices, applications, etc., such as softphone 130, a voice server, a call data server, etc., to register with or establish a session with these other devices, applications, etc.

According to an exemplary embodiment, call manager 125 operates partially as a web-application and partially as a Windows application or other suitable desktop application (e.g., Linux, Mac OS, etc.). For example, as previously described, call manager 125 may operate as a RESTful web service endpoint that listens for commands from web graphical user interface 305 of service software 115 and also communicates with softphone 130 (e.g., a desktop application). In contrast to other approaches, to allow a browser page context to communicate with a client, certain processes may be performed. For example, an ActiveX control of a .NET component may require instantiating an object in JavaScript, obtaining proper permissions (e.g., in a browser setting), etc. According to an exemplary embodiment of call manager 125, as described herein, these processes are not needed.

According to an exemplary embodiment, when the representative logs on to service software 115 of network device 110, as previously described, service software 115 obtains representative profile information. Based on the representative profile information (e.g., line of business to which the representative belongs, etc.), the representative has particular destinations to which the representative may transfer calls. When the representative selects a destination via call management user interface 320, context handler 150 generates and transmits a JSONP request to call manager 125. Call manager 125 may communicate with a voice server and softphone 120 to transfer the call to the selected destination.

Figure 4:
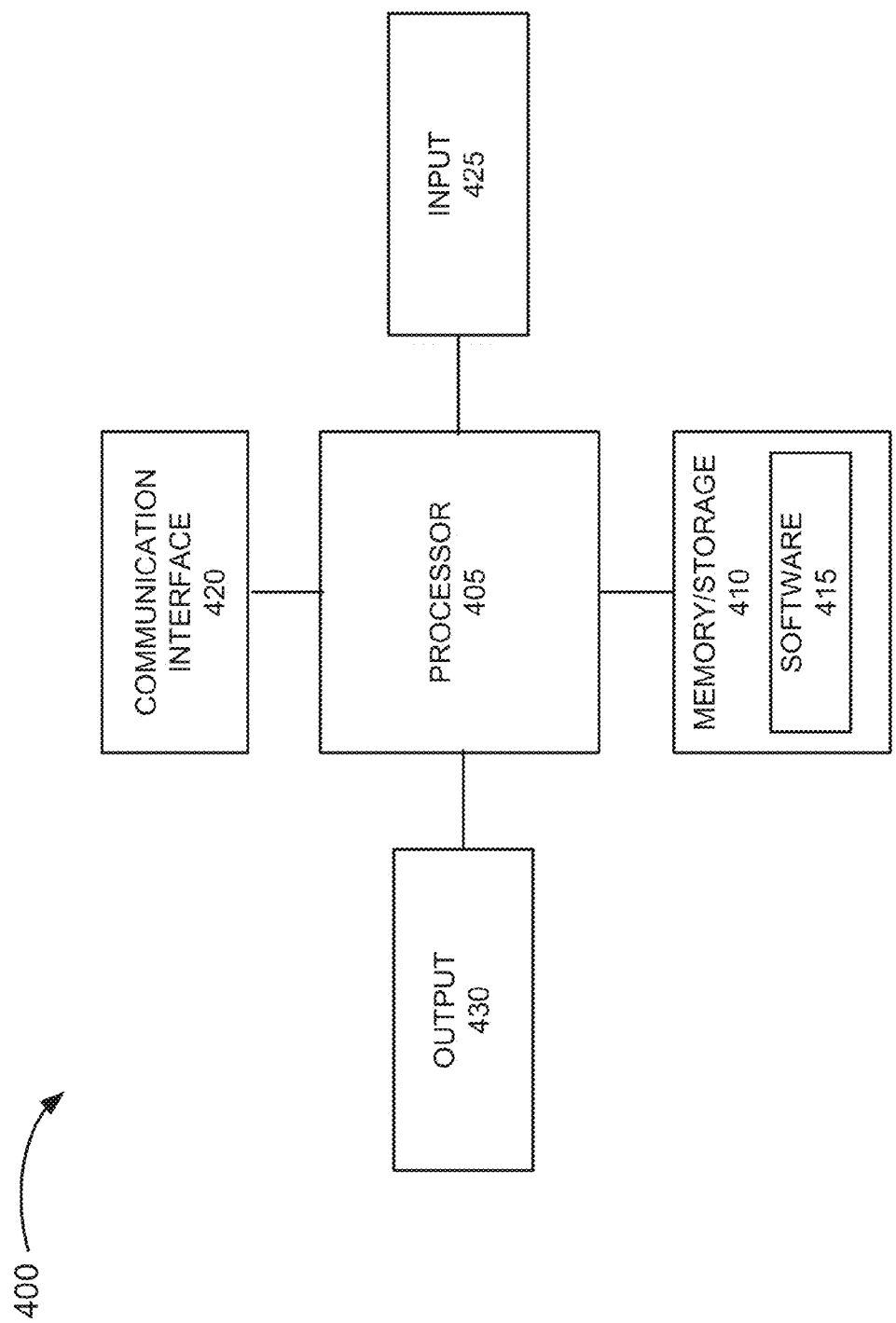
FIG. 4 is a diagram illustrating exemplary components of a device that may correspond to one or more of the devices in the exemplary environment.

FIG. 4 is a diagram illustrating exemplary components of a device 400 that may correspond to one or more of the devices in environment 100. For example, device 400 may correspond to components included in user device 120 or other device(s) that may be used in a streaming process. As illustrated, device 400 includes a processor 405, a memory/storage 410 that stores software 415, a communication interface 420, an input 425, and an output 430. According to other implementations, device 400 may include fewer components, additional components, different components, and/or a different arrangement of components than those illustrated in FIG. 4 and described herein.

Processor 405 includes one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs), or some other component that interprets and/or executes instructions and/or data. Processor 405 may be implemented as hardware (e.g., a microprocessor, etc.) or a combination of hardware and software (e.g., a SoC, an ASIC, etc.). Processor 405 may include one or multiple memories (e.g., memory/storage 410), etc.

Processor 405 may control the overall operation, or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., another device, a network, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 410 may include a hard disk (e.g., a magnetic disk, an optical disk, a magneto-optic disk, a solid state disk, etc.) and a corresponding drive. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storage medium (e.g., a compact disk (CD), a digital versatile disk (DVD), a Blu-Ray® disk (BD), etc.). Memory/storage 410 may store data, software, and/or instructions related to the operation of device 400

Software 415 includes an application or a program that provides a function and/or a process. Software 415 may include firmware. For example, with reference to user device 120, software 415 may include an application that, when executed by processor 405, provides the functions of call manager 125 and context handler 150, as described herein.

Communication interface 420 permits device 400 to communicate with other devices, networks, systems and/or the like. Communication interface 420 includes one or multiple wireless interface(s) and/or wired interface(s). For example, communication interface 420 may include one or multiple transmitter(s) and receiver(s), or transceiver(s).

Input 425 provides an input into device 400. For example, input 425 may include a keyboard, a keypad, a touchscreen, a touch pad, a touchless screen, a mouse, an input port, a button, a switch, a microphone, a knob, and/or some other type of input.

Output 430 provides an output from device 400. For example, output 430 may include a display, a speaker, a light (e.g., light emitting diode(s), etc.), an output port, a vibratory mechanism, and/or some other type of output.

Device 400 may perform a function or a process in response to processor 405 executing software instructions stored by memory/storage 410. For example, the software instructions may be read into memory/storage 410 from another memory/storage 410 or read from another device via communication interface 420. The software instructions stored in memory/storage 410 may cause processor 405 to perform processes described herein. Alternatively, according to another implementation, device 400 may perform a process or a function based on the execution of hardware (e.g., processor 405, etc.).

Figure 5A:
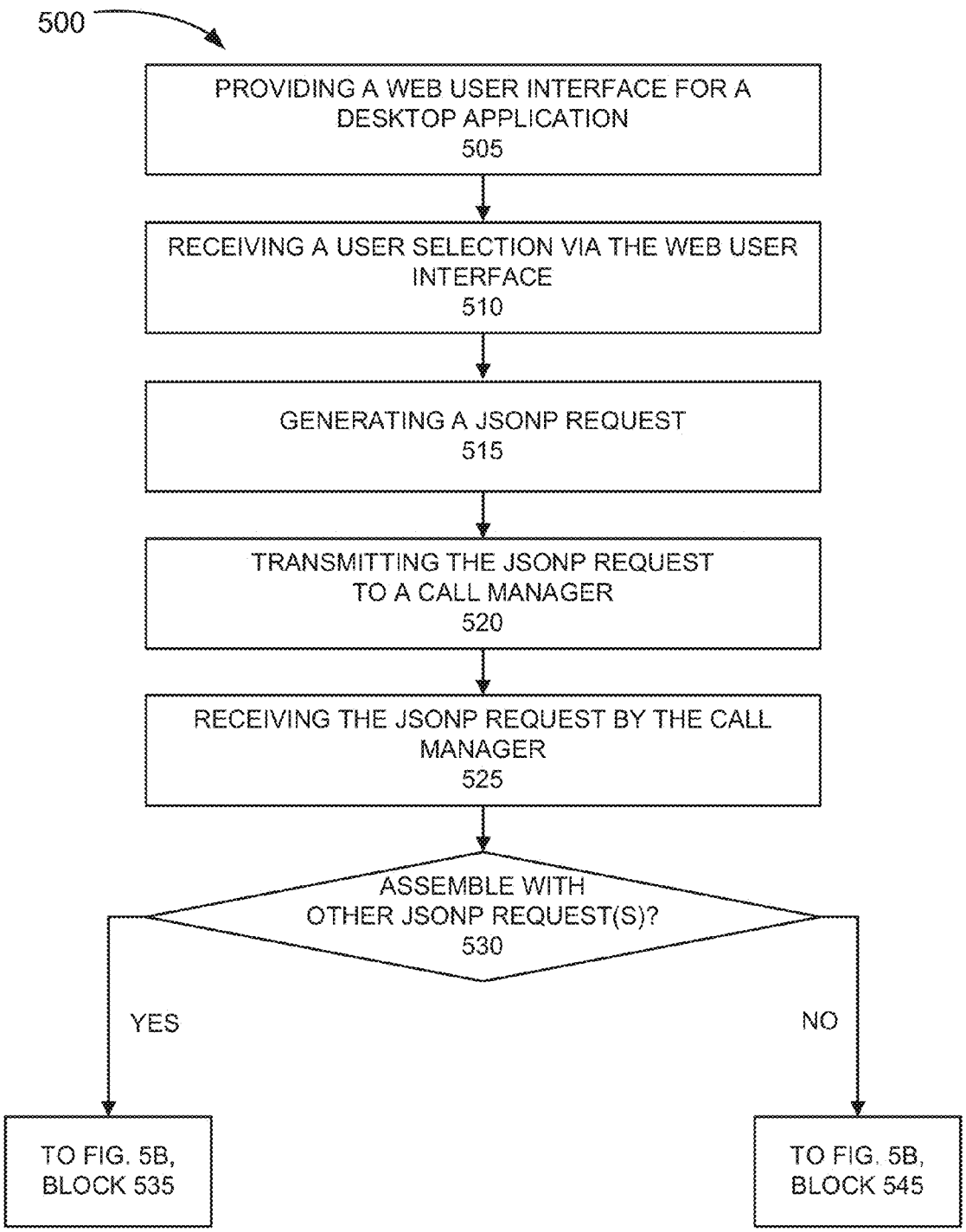
FIGS. 5A-5C are flow diagrams illustrating an exemplary process of a web-based call interaction using a call manager that includes a finite state machine.
Figure 5B:
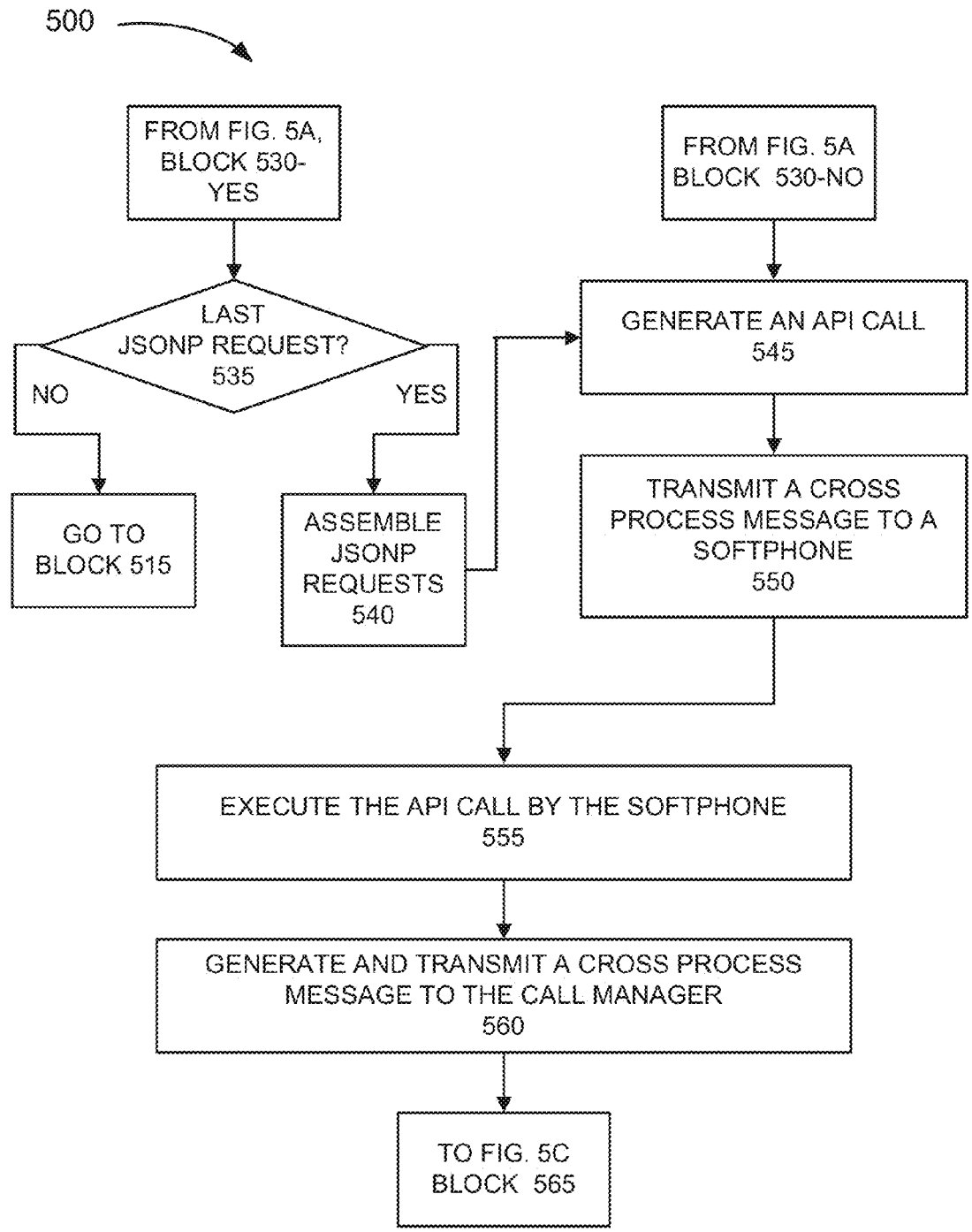
Figure 5C:
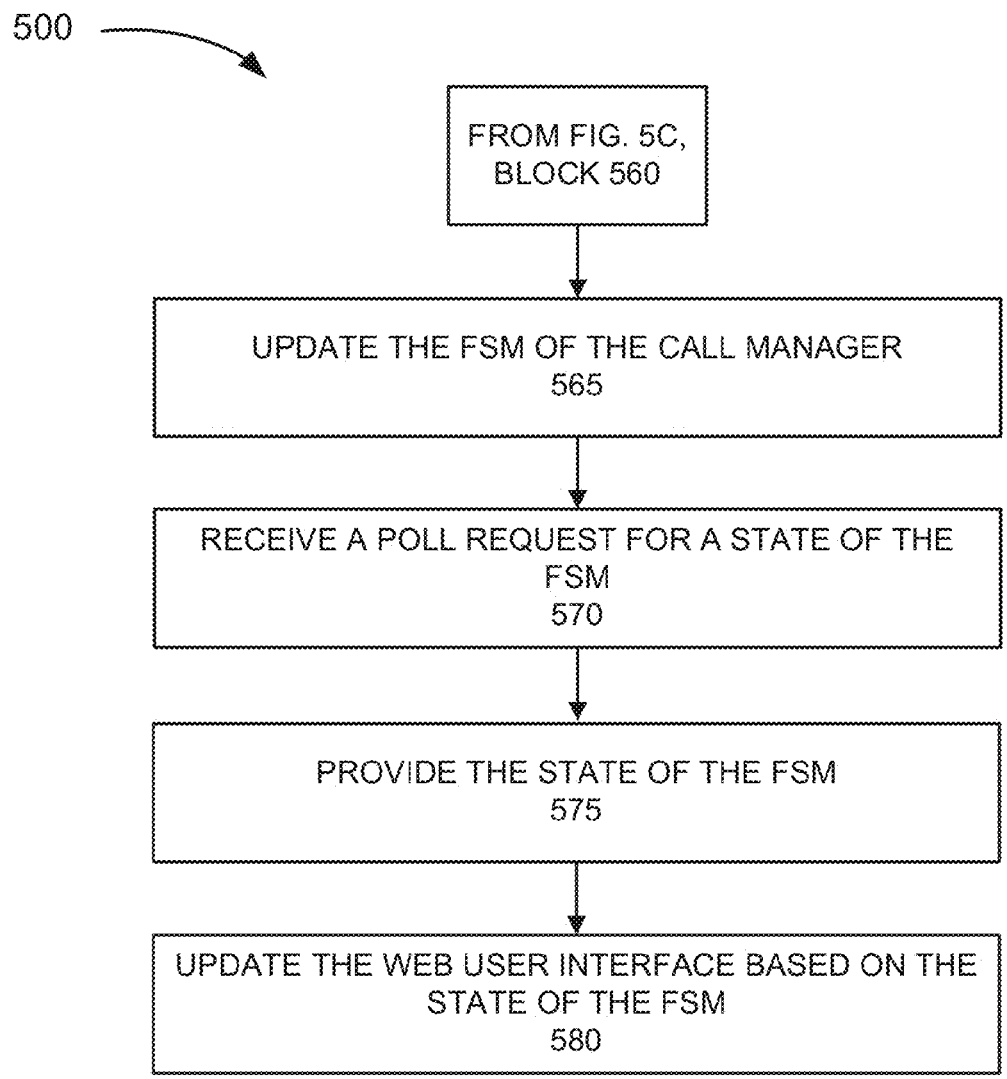

FIGS. 5A-5C are flow diagrams illustrating an exemplary process 500 of an exemplary embodiment of a web-based call interaction using a call manager that includes a finite state machine. According to an exemplary embodiment, one or more operations of process 500 are performed by call manager 125. For example, the functionality of call manager 125 may be implemented as processor 405 executing software 415. Process 500 may be described in reference to any of the preceding figures, as well as any of the previously described scenarios. For purposes of description, it may be assumed that call manager 125 has received a configuration file and that an active session between call manager 125 and service software 115 exists.

Referring to FIG. 5A, in block 505, a web user interface a desktop application is provided. For example, a web browser 135 of user device 120 displays web graphical user interface 305 to a representative operating user device 120.

In block 510, a user selection via the web user interface is received. For example, the representative selects a graphical element of call management user interface 320 using a mouse of user device 120. By way of example, assume the representative selected a call button after dialing a telephone number to reach a customer.

In block 515, a JSONP request is generated. For example, context handler 150 determines that a single JSONP request may be generated based on the identified verb and parameters. Context handler 150 generates a JSONP request.

In block 520, the JSONP request is transmitted to a call manager. For example, context handler 150 transmits the JSONP request to call manager 125. Call manager 125 is running as a RESTful web service.

In block 525, the JSONP request is received by the call manager. For example, call manager 125 receives the JSONP request. Call manager 125 interprets the verb included in JSNOP request. Call manager 125 compares the event to FSM 200 to see if the event is valid based on the current state indicated by FSM 200. For purposes of description, assume that call manager 125 determines that the event is valid.

In block 530, it is determined whether other JSONP request(s) is/are to be assembled. For example, call manager 125 inspects the JSONP request to determine whether there is a sequence number or a flag in the JSONP request. If it is determined that other JSONP request(s) is/are to be assembled (block 530—YES), then it is determined whether this is the last JSONP request (block 535—FIG. 5B). For example, call manager 125 inspects the JSONP request to determine whether the JSONP request includes a last sequence number of a series of multiple JSONP requests or a flag exists indicative of a last JSONP request.

Referring to FIG. 5B, if it is determined that this is not the last JSONP request (block 535—NO), then process 500 proceeds to block 515 of FIG. 5A. That is, context handler 150 will generate and transmit at least one additional JSONP request to call manager 125. Call manager 125 stores the JSONP request(s) or relevant portion for subsequent assembly. However, if it is determined that the JSONP request is the last JSONP request (block 535—YES), then the JSONP requests are assembled (block 540). For example, call manager 125 assembles the data included in the JSONP requests. As further illustrated in FIG. 5B, after assembly of the JSONP requests, process 500 proceeds to block 545, as described below.

Referring back to FIG. 5A, if it is determined that other JSONP request(s) is/are not to be assembled (block 530-NO), then an API call is generated (block 545—FIG. 5B). For example, call manager 125 generates an API call for softphone 130. For example, the API call will cause softphone 130 to establish a call.

In block 550, a cross process message is transmitted to a softphone. For example, call manager 125 transmits a .NET message to softphone 130. In block 555, the API call is executed by the softphone. For example, softphone 130 receives the .NET message and executes the API call. For example, softphone 130 transmits a call establishment message to an ACD device or a voice switch. Softphone 130 may also transmit call data to a call data server.

In block 560, a cross process message is generated and transmitted to the call manager. For example, softphone 130 generates a .NET message for call manager 125 to indicate a call ringing state. Softphone 130 transmits the .NET message to call manager 125.

Referring to FIG. 5C, in block 565, the finite state machine of the call manager is updated. For example, call manager 125 receives the .NET message and updates the state of finite state machine 200 to a ringing state.

In block 570, a poll request for a state of the finite state machine is received. For example, context handler 150 polls the finite state machine 200 of call manager 125 to obtain a current state of finite state machine 200.

In block 575, the state of the finite state machine is provided. For example, call manager 200 provides the state to context handler 150.

In block 580, the web user interface is updated based on the state of the finite state machine. For example, context handler 150 renders call management user interface 320 to a ringing state. For example, numeric buttons are displayed as inactive buttons. Call manager user interface 320 may display an overlay that indicates the call is ringing.

Although FIGS. 5A-5C illustrate an exemplary process 500, according to other implementations, process 500 may include additional operations, fewer operations, and/or different operations than those illustrated in FIGS. 5A-5C, and described herein.

In the preceding specification, various embodiments have been described with reference to the accompanying drawings. However, various modifications and changes may be made thereto, and additional embodiments may be implemented, without departing from the broader scope of the invention as set forth in the claims that follow. For example, although the preceding exemplary embodiments have been described in relation to a softphone, other types of communicative applications may be implemented. By way of example, user device 120 may include software for video conferencing, instant messaging, e-mail, etc. In this regard, call manager 125 may generate API calls to various types of communicative applications. Additionally, web graphical user interface 305 may correspondingly include a graphical user interface relating to the communicative application. The specification and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A-5C, the order of the blocks may be modified in other implementations. Further, non-dependent blocks may be performed in parallel. Additionally, with respect to other processes described in this description, the order of operations may be different according to other implementations, and/or operations may be performed in parallel.

Embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 410.

The embodiments described herein may be implemented in many different forms of software executed by hardware. For example, a process or a function may be implemented as "logic" or as a "component." The logic or the component may include, for example, hardware (e.g., processor 405, etc.), or a combination of hardware and software (e.g., software 415). The embodiments have been described without reference to the specific software code since software can be designed to implement the embodiments based on the description herein.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A method, comprising:
   receiving, on a user device, a graphical user interface from a network device;
   displaying, on the user device, the graphical user interface, which allows a user to control a softphone operating on the user device;
   receiving a user selection via the graphical user interface;
   generating, by a context handler operating on the user device, a JavaScript Object Notation with Padding (JSONP) request based on the user selection;
   transmitting, by the context handler, the JSONP request to a call manager operating on the user device, wherein the call manager provides communication between the softphone and the context handler;
   obtaining, by the context handler and from the call manager, in response to the transmitting, a JSONP response that includes new state data indicating a state of the softphone resulting from an execution of the user selection by the softphone; and
   updating, by the context handler, the graphical user interface in correspondence to the new state data.

2. The method of claim 1, further comprising:
   receiving, by the call manager, the JSONP request;
   generating, by the call manager, an application programming interface call in response to the receiving of the JSONP request; and
   transmitting as a cross process communication, by the call manager, the application programming interface call to the softphone.

3. The method of claim 2, wherein the call manager operates as a RESTful web service and has a Uniform Resource Locator.

4. The method of claim 2, further comprising:
   receiving, by the softphone, the application programming interface call;
   executing, by the softphone, the application programming interface call; and
   transmitting as a cross process communication, by the softphone, a confirmation code to the call manager indicating that the application programming interface call has been successfully executed.

5. The method of claim 4, further comprising:
   receiving, by the call manager, the confirmation code;
   storing, by the call manager, a finite state machine that includes possible states of the softphone; and
   updating, by the call manager, a current state indicated in the finite state machine to reflect a new state resulting from the executing of the application programming interface call.

6. The method of claim 1, wherein the generating comprises:
   determining whether a data size limitation of the JSONP is exceeded based on the user selection;
   generating multiple JSONP requests in response to determining that a single JSONP request would exceed the data size limitation; and
   transmitting the multiple JSONP requests.

7. The method of claim 6, further comprising:
receiving, by the call manager, the multiple JSONP requests; and
transmitting, by the call manager, an acknowledgement in response to receiving each JSONP request.

8. The method of claim 1, further comprising:
receiving, by the call manager, the JSONP request;
storing, by the call manager, a finite state machine that includes possible states of the softphone;
verifying, by the call manager, whether a state associated with the user selection is valid based on a comparison to a current state indicated in the finite state machine; and
generating, by the call manager, an application programming interface call in response to the receiving of the JSONP request when a result of the verifying is that the state associated with the user selection is a valid state relative to the current state.

9. The method of claim 1, further comprising
establishing a secure sockets layer communication link between the user device and a network device that hosts the graphical user interface, and wherein the transmitting comprises:
transmitting the JSONP request to the call manager, wherein the call manager operates as a RESTful web service.

10. A system comprising:
a call management device of a call center comprising:
a communication interface;
a memory to store instructions; and
a processor to execute the instructions to:
receive, via the communication interface, a graphical user interface hosted by a network device;
display the graphical user interface, which allows a user to control a softphone, which operates on the call management device, that handles in-bound and out-bound calls to the call center;
receive a user selection via the graphical user interface;
generate, by a context handler operating on the call management device, a JavaScript Object Notation with Padding (JSONP) request in response to a receipt of the user selection;
transmit the JSONP request to a call manager, which operates on the call management device, wherein the call manager provides communication between the softphone and the context handler;
obtain in response to a transmission of the JSONP request and from the call manager, a JSONP response that includes new state data indicating a state of the softphone resulting from an execution of the user selection by the softphone; and
display an update to the graphical user interface in correspondence to the new state data.

11. The system of claim 10, wherein the processor executes the instructions to:
receive, by the call manager, the JSONP request;
generate, by the call manager, an application programming interface call in response to a receipt of the JSONP request; and
transmit, as a cross process communication, by the call manager, the application programming interface call to the softphone.

12. The system of claim 11, wherein the call manager, when executed, operates as a RESTful web service on the call management device and has a Uniform Resource Locator.

13. The system of claim 11, wherein the processor to execute the instructions to:
receive, by the softphone, the application programming interface call;
execute the application programming interface call; and
transmit, as a cross process communication, a confirmation code to the call manager indicating that the application programming interface call has been successfully executed.

14. The system of claim 13, wherein the processor to execute the instructions to:
receive the confirmation code;
store a finite state machine that includes possible states of the softphone; and
update a current state indicated in the finite state machine to reflect a new state resulting from an execution of the application programming interface call.

15. The system of claim 10, wherein the processor to execute the instructions to:
determine whether a data size limitation of the JSONP is exceeded based on the user selection;
generate multiple JSONP requests in response to a determination that a single JSONP request would exceed the data size limitation; and
transmit the multiple JSONP requests to the call manager.

16. The system of claim 15, wherein the processor executes the instructions to:
receive, by the call manager, the multiple JSONP requests; and
transmit, by the call manager, an acknowledgement for each JSONP request received, to the context handler, wherein the system further comprises:
a web server, wherein the network device is the web server and the graphical user interface is a web-based graphical user interface.

17. A user device comprising:
call manager software;
softphone software;
context handler software, wherein the call manager software provides communication between the softphone software and the context handler software;
a communication interface;
a memory to store first instructions of the call manager software; and
a processor to execute the first instructions to:
receive, by the call manager software, a JavaScript Object Notation with Padding (JSONP) request from the context handler software, wherein the JSONP request includes verb data and parameter data indicative of a user selection of a graphical element in a call management user interface displayed by the user device;
generate, by the call manager, an application programming interface call in response to a receipt of the JSONP request; and
transmit the application programming interface call to the softphone software, wherein the call management user interface is capable of controlling an operation of the softphone software.

18. The user device of claim 17, wherein the call manager software, when executed, operates as a RESTful web service, and the memory to store second instructions of the softphone software; and the processor to execute the second instructions to:
receive the application programming interface call;
execute the application programming interface call; and transmit a confirmation code to the call manager software indicating that the application programming interface call has been successfully executed.

19. The user device of claim 18, wherein the processor to execute the first instructions of the call manager software to:
receive the confirmation code;
store a finite state machine that includes each possible state of a softphone of the softphone software;
update a current state indicated in the finite state machine to reflect a new state resulting from the executing of the application programming interface call; and
provide the new state to the context handler in a JSONP response.

20. The user device of claim 17, wherein the processor to execute the first instructions of the call manager software to:
store a finite state machine that includes each possible state of a softphone of the softphone software;
verify whether a state associated with the user selection is valid based on a comparison of a current state indicated in the finite state machine; and wherein when the application programming interface call is generated, the processor to execute the first instructions to:
generate the application programming interface call in response to the receipt of the JSONP request when a result of a verification is that the state associated with the user selection is a valid state relative to the current state.

* * * * *